(12) United States Patent
Francis

(10) Patent No.: US 7,799,248 B2
(45) Date of Patent: Sep. 21, 2010

(54) DEMOLDING AIDS FOR SILICONE HYDROGELS AND RELATED METHODS

(75) Inventor: Charles Francis, Pleasanton, CA (US)

(73) Assignee: CooperVision International Holding Company, LP, St. Michael (BB)

( * ) Notice: Subject to any disclaimer, the term of this patent is extended or adjusted under 35 U.S.C. 154(b) by 465 days.

(21) Appl. No.: 11/724,944

(22) Filed: Mar. 15, 2007

(65) Prior Publication Data

US 2007/0216045 A1 Sep. 20, 2007

Related U.S. Application Data

(60) Provisional application No. 60/784,953, filed on Mar. 20, 2006.

(51) Int. Cl.
B29D 11/02 (2006.01)
B29D 11/00 (2006.01)
G02B 3/02 (2006.01)

(52) U.S. Cl. .............. 264/1.32; 524/356; 524/361; 524/379; 524/381; 526/279; 523/106; 523/107; 264/1.1; 264/2.1

(58) Field of Classification Search ............ 264/1.1, 264/1.32, 2.1, 2.5; 523/106, 107; 524/356, 524/361, 379, 381; 526/279
See application file for complete search history.

(56) References Cited

U.S. PATENT DOCUMENTS

| | | | |
|---|---|---|---|
| 1,926,567 A * | 9/1933 | Schaack, Jr. ............ 568/414 |
| 3,916,033 A | 10/1975 | Merrill |
| 4,159,292 A | 6/1979 | Neefe |
| 5,639,510 A | 6/1997 | Kindt-Larsen et al. |
| 5,674,557 A | 10/1997 | Widman et al. |
| 5,690,865 A | 11/1997 | Kindt-Larsen et al. |
| 5,693,268 A | 12/1997 | Widman et al. |
| 5,760,100 A | 6/1998 | Nicolson et al. |
| 5,770,119 A | 6/1998 | Walker et al. |
| 5,779,943 A | 7/1998 | Enns et al. |
| 5,820,895 A | 10/1998 | Widman et al. |
| 5,837,314 A | 11/1998 | Beaton et al. |
| 5,935,492 A | 8/1999 | Martin et al. |
| 6,071,111 A * | 6/2000 | Doke et al. ............ 425/412 |
| 6,565,776 B1 | 5/2003 | Li et al. |
| 6,638,451 B1 * | 10/2003 | Hagmann et al. ......... 264/1.38 |
| 6,663,801 B2 | 12/2003 | Pegram et al. |
| 6,867,245 B2 * | 3/2005 | Iwata et al. ............ 523/107 |
| 6,869,549 B2 | 3/2005 | Ansell et al. |
| 6,913,715 B2 | 7/2005 | Li et al. |
| 7,052,131 B2 * | 5/2006 | McCabe et al. ......... 351/160 H |
| 7,390,863 B2 * | 6/2008 | Salamone et al. ......... 526/279 |
| 2002/0016383 A1 * | 2/2002 | Iwata et al. ............ 523/106 |
| 2002/0137811 A1 * | 9/2002 | Turek et al. ............ 523/106 |
| 2003/0125498 A1 | 7/2003 | McCabe et al. |
| 2004/0265737 A1 * | 12/2004 | Hanamura et al. ....... 430/270.1 |
| 2005/0157399 A1 * | 7/2005 | Hanamura ............ 359/642 |
| 2005/0205451 A1 | 9/2005 | Brown-Skrobot et al. |
| 2006/0063852 A1 * | 3/2006 | Iwata et al. ............ 523/106 |
| 2006/0071356 A1 | 4/2006 | Beebe |
| 2006/0097415 A1 | 5/2006 | Watterson et al. |
| 2007/0035049 A1 | 2/2007 | Bruce et al. |
| 2007/0036878 A1 | 2/2007 | Goodenough et al. |
| 2007/0066706 A1 | 3/2007 | Manesis et al. |

FOREIGN PATENT DOCUMENTS

| | | |
|---|---|---|
| EP | 0 362 137 A3 | 4/1990 |
| WO | WO 03/022321 A2 | 3/2003 |

OTHER PUBLICATIONS

Notification Concerning Transmittal of International Preliminary Report on Patentability and International Preliminary Report issued in corresponding International Patent Application No. PCT/US2007/006562 dated Oct. 2, 2008 (7 pages).

* cited by examiner

*Primary Examiner*—Joseph S Del Sole
*Assistant Examiner*—Nahida Sultana
(74) *Attorney, Agent, or Firm*—Kilyk & Bowersox, P.L.L.C.

(57) ABSTRACT

Compositions and methods for improving demolding polar resin molds used in the production of silicone hydrogel materials are described. The present compositions and methods include the use of one or more reactive demolding agents. The reactive demolding agents react with components of a polymerization mixture to produce a polymerized silicone hydrogel device containing a reactant product of the demolding agent and the other components of the polymerization mixture. Polar resin molds used during the polymerization of the polymerization mixture are more easily separated than substantially identical molds used in the polymerization of a substantially identical material without a reactive demolding agent. The present compositions and methods may be used in the manufacture of silicone hydrogel lenses, such as contact lenses. The demolding aids may also be useful as delensing aids.

14 Claims, No Drawings

DEMOLDING AIDS FOR SILICONE HYDROGELS AND RELATED METHODS

CROSS-REFERENCE TO RELATED APPLICATIONS

This application claims the benefit of priority of U.S. provisional Application No. 60/784,953, filed Mar. 20, 2006, the content of which is hereby incorporated by reference.

FIELD

The present invention is directed to compositions and methods used in the production of polymerized silicone hydrogel devices, and to the devices produced by such compositions and methods. More specifically, the invention relates to silicone hydrogel contact lenses and compositions and methods used in the production thereof.

BACKGROUND

Silicone hydrogel contact lenses have become popular due to the ability of contact lens wearers to wear such lenses on their eyes for longer times compared to non-silicone hydrogel contact lenses. Benefits to lens wearers associated with silicone hydrogel contact lenses can be attributed, at least in part, to the combination of hydrophilic components and the hydrophobic properties of silicone-containing polymeric materials of the contact lenses.

Non-silicone hydrogel contact lenses, such as 2-hydroxyethylmethacrylate (HEMA)-based contact lenses, are often produced in non-polar resin contact lens molds. In other words, lens precursor compositions for non-silicone hydrogel contact lenses are polymerized in non-polar resin contact lens molds to produce polymeric lenses. A contact lens mold typically includes a female mold member and a male mold member, which can be assembled together by an interference type of engagement or other forms of engagement to form a contact lens mold having a contact lens shaped cavity. Non-polar resins, such as polypropylene and polystyrene, are useful in producing such molds since the plastic mold members are easily separated and are deformable to facilitate the engagement and separation of the mold members.

However, existing silicone hydrogel contact lenses produced using non-polar resin molds may have hydrophobic lens surfaces. In other words, the surfaces of such silicone hydrogel contact lenses have low wettability and therefore are not ophthalmically compatible. Surface treatments or surface modifications have been used on the surfaces of such silicone hydrogel contact lenses to increase the hydrophilicity and wettability of the lens surfaces. One approach involves treating the surface of the polymerized lens, for example using plasma techniques, to increase its hydrophilicity of the lens surface. Another approach involves derivatizing the hydrogel monomer mix during polymerization using reactive hydrophilic moieties to confer a hydrophilic surface after the lens has been formed. Surface treatment of contact lenses requires increased machinery and time to produce contact lenses compared to manufacturing methods that do not use surface treatments or modifications.

As an alternative to surface treatment, it has been found that silicone hydrogel contact lenses with ophthalmically acceptable surface wettabilities can be produced using polar resin molds instead of non-polar resin molds. For example, silicone hydrogel contact lenses formed in ethylenevinyl alcohol or polyvinyl alcohol based molds have desirable surface wettabilities. One example of a useful polar resin used in the manufacture of silicone hydrogel contact lenses is a resin of ethylene-vinyl alcohol copolymers such as the ethylene-vinyl alcohol copolymer resin sold under the trade name Soarlite™ by Nippon Gohsei, Ltd. In addition to its polarity, Soarlite™ is said to have the following preferred characteristics: extremely high mechanical strength, antistatic properties, low contractility when used in molding processes, excellent oil and solvent resistance, small coefficient of thermal expansion, and good abrasion resistance.

Although polar resins provide a desirable alternative for producing silicone hydrogel contact lenses, polar resin molds are less deformable or flexible than non-polar resin molds, and are relatively more difficult to work with. Therefore, alternative forms of securing polar resin mold members together may be used. For example, male and female polar resin mold members may be welded together to form a contact lens mold having a lens shaped cavity. During the production of silicone hydrogel contact lenses, it is necessary to separate the male and female polar resin mold members to reveal the polymerized silicone hydrogel lens product. The separation of the polar resin mold members is difficult and can present challenges to the automation and throughput of large numbers of such contact lenses. For example, separation of polar resin mold members may require the use of ultrasonic energy, applying a temperature differential across the contact lens mold, contacting the contact lens mold with a heated liquid, separating the mold members using wedging instruments, and the like. Not only can the demolding of the male and female mold members be difficult, but the delensing or deblocking of the polymerized lens from a mold member without damaging the lens can be difficult to achieve. While not wishing to be limited by theory in any way, this difficulty may be caused at least in part by electrostatic interactions, dipole-dipole interactions, ion-dipole interactions, hydrogen bonding, and Van der Walls forces between the polymerized lens and the mold halves.

Examples of documents which may relate to the production of contact lenses, such as silicone hydrogel contact lenses, include U.S. Pat. Nos. 4,121,896; 4,495,313; 4,565,348; 4,640,489; 4,889,664; 4,985,186; 5,039,459; 5,080,839; 5,094,609; 5,607,518; 5,850,107; 5,935,492; 6,867,245; 6,869,549; 6,939,487; and U.S. Patent Publication No. 20050154080.

In sum, an existing problem relates to the difficulty of separating polar resin mold members used in the production of silicone hydrogel products, such as silicone hydrogel contact lenses. In view of the above, there remains a need for new and improved ways in which to separate polar resin mold members used in the production of silicone hydrogel products or devices with desirable properties, such as silicone hydrogel contact lenses with ophthalmically acceptable properties, including desirable surface wettabilities and the like. The current invention meets this need, among others.

SUMMARY

New silicone hydrogel products, such as silicone hydrogel contact lenses or contact lenses including a hydrophilic silicon-containing polymeric material, and chemical compositions and methods for producing such hydrogel products are provided herein. Aspects of the present invention are related to the discovery that reactive demolding agents or reactive demolding aids can be included in a pre-polymerized silicone hydrogel composition to thereby provide improvements, such as reduced effort or enhanced ease, in separating polar resin mold components used in a silicone hydrogel polymerization process. Such improvements are particularly apparent when compared to demolding of polar resin molds containing silicone hydrogel compositions absent such a demolding aid or demolding aids. The inclusion of one or more reactive demolding aids facilitates separation of two polar resin mold members without negatively impacting the properties of the silicone hydrogel product contained therein.

In more detail, the present compositions and methods reduce the effort required to demold or separate mold members that are coupled together in the form of a mold having a lens shaped cavity, and/or improve delensing of the polymerized lens product from a mold member used in the formation of the lens product. The compositions and methods are particularly useful in improving the demolding of polar resin mold members and delensing or deblocking of silicone hydrogel contact lenses from polar resin mold members.

The present contact lenses, compositions, and methods are based on the use or inclusion of one or more reactive demolding aids in a lens precursor composition, such as a silicone hydrogel lens precursor composition, to facilitate demolding of mold members of a lens mold and/or delensing of a polymerized silicone hydrogel lens product from a mold member. The demolding aids are chemically reactive agents that can be added to a lens precursor composition prior to the full polymerization of the composition.

Embodiments of the present lenses, compositions and methods will be apparent from the following description and claims.

For example, in one embodiment, a lens precursor composition, such as a silicone hydrogel contact lens precursor composition, comprises components, such as monomers, oligomers, macromers, and the like useful in producing contact lenses, and one or more demolding aids. The demolding aids are reactive with the lens precursor composition components. The present lens precursor compositions can be provided in a lens mold, or in a cavity of a mold member, such as a female mold member, of a lens mold.

In another embodiment, a polymerized lens, such as a polymerized silicone hydrogel contact lens, comprises a reaction product of a demolding aid and other lens forming components. The polymerized lens can be present in a lens mold, such as after a polymerization or curing procedure, or the polymerized lens can be a lens that has undergone one or more extraction steps and one or more hydration steps. For example, a hydrated silicone hydrogel contact lens comprises a reaction product of a demolding aid and silicone hydrogel contact lens forming components of a lens precursor composition.

In further embodiments, a contact lens mold comprises a lens precursor composition comprising a chemically reactive demolding aid, or a contact lens mold comprises a polymerized contact lens product which comprises a reaction product of a demolding aid and lens forming components.

In yet another embodiment, a method of producing contact lenses, such as silicone hydrogel contact lenses, comprises adding a demolding aid to a lens precursor composition or forming a lens precursor composition to include a demolding aid. A method may also comprise curing a lens precursor composition which contains a demolding aid in a lens mold to produce a polymerized lens which includes a reaction product of the demolding aid and other lens forming components. A method may also comprise one or more demolding and delensing steps of such lens molds and lenses produced therein with reduced effort relative to demolding and delensing steps, respectively, of molds and lenses that do not include a demolding aid. The methods may optionally include one or more extracting, hydrating, sterilizing, and/or packaging steps.

In specific embodiments, a silicone hydrogel contact lens precursor composition comprises one or more chemically reactive demolding aids. A silicone hydrogel contact lens comprises a reaction product or products of reactants comprising a chemically reactive demolding aid and polymerizable monomer and macromer components of a silicone hydrogel lens precursor composition. A polar resin contact lens mold comprises the foregoing lens precursor composition or the foregoing silicone hydrogel contact lens. Further, a method of producing a silicone hydrogel contact lens comprises forming a silicone hydrogel lens precursor composition that includes at least one chemically reactive demolding aid, placing the lens precursor composition in a contact lens mold, curing the lens precursor composition in the contact lens mold, demolding a male mold member from a female mold member, and delensing the silicone hydrogel contact lens from one of the mold members.

As can be appreciated from the foregoing and following description, each and every feature described herein, and each and every combination of two or more of such features, is included within the scope of the present invention provided that the features included in such a combination are not mutually inconsistent. In addition, any feature or combination of features may be specifically excluded from any embodiment of the present invention.

Additional aspects and advantages of the present invention are set forth in the following description and claims, particularly when considered in conjunction with the accompanying examples.

DEFINITIONS

In accordance with the present invention and as used herein, the following terms are defined with the following meanings, unless explicitly stated otherwise. Other terms are defined in the text or in a manner consistent with their use.

It must be noted that, as used in this specification, the singular forms "a," "an," and "the" include plural referents unless the context clearly dictates otherwise. Thus, for example, reference to a "contact lens" includes a single lens as well as two or more of the same or different lenses, reference to a "precursor composition" refers to a single composition as well as two or more of the same or different compositions, and the like.

The term 'demolding' refers to the process of separating two mold members, such as male and female mold members, of a mold containing a polymerized product or device. In the case of lenses, such as contact lenses, demolding refers to the separation of two mold members that are coupled together to define a lens shaped cavity.

The term 'deblocking' refers to the process of removing or separating a polymerized product or device from a mold member. In situations where the product or device is a lens, deblocking may also be referred to as delensing. Thus, the term 'delensing' refers to the process of removing or separating a polymerized ophthalmic device from a mold member.

The term 'hydrogel' refers to a polymeric material, typically a network or matrix of polymer chains, capable of swelling in water or become swollen with water. The matrix may or may not be cross-linked. Thus, hydrogels refer to polymeric materials, including contact lenses, that are water swellable or water swelled. A hydrogel may be (i) unhydrated and water swellable, or (ii) partially hydrated and swollen with water, or (iii) fully hydrated and swollen with water.

The term 'Soarlite™' refers to the trade name of certain ethylene-vinyl alcohol copolymers manufactured by Nippon Gohsei, Ltd. for injection molding applications.

A 'polymerization mixture' may be understood to be a pre-polymerized or pre-cured composition suitable for polymerization. For example, for lens applications, a polymerization mixture may be a lens precursor composition. A polymerization mixture may also be referred to as a monomer mix. Preferably, the polymerization mixture or lens precursor composition is not polymerized before curing or polymerization of the mixture or composition. However, polymerization mixtures or lens precursor compositions may be partially polymerized before undergoing a curing process.

The term 'polymerized mixture' refers to a mixture of a first polymer material, preferably a cross-linked polymer material, which may be water swellable; and to a second polymeric material, other than the first material, selected from water soluble polymeric materials, water swellable polymeric materials and mixtures thereof. In the polymerized mixture, a major portion (i.e., greater than 50% by weight) of the components of the mixture are polymerized. The polymerized mixture may include unpolymerized components that can be extracted from the polymerized mixture. A polymerized mixture can be formed by polymerizing or curing a polymerization mixture.

The term 'diluent' refers to a non-reactive, extractable material added to a polymerization mixture or a pre-polymerized mixture.

The term 'additive' in the context of the present application means a compound or agent not necessary for the manufacture of a hydrogel ophthalmic device but which aids in facilitating a demolding, deblocking, or delensing process when present in a polymerization mixture or polymerized mixture, as defined herein, compared to an identical polymerization mixture or polymerized mixture lacking such additive. Examples of additives are diluents and reactive demolding monomer agents, among other things.

'Wettable' in the context of the present application is a term of a property of a surface of a polymerized mixture, such as a contact lens. Wettability refers to the hydrophilicity of one or more surfaces of a contact lens. As used herein, a surface of a lens can be considered wettable if the lens receives a score of 5 or above in a wettability assay conducted as follows. A lens is dipped into distilled water, removed from the water, and the length of time that the water film takes to break from said lens is determined. The assay grades lenses on a linear scale of 1-10, where a score of 10 refers to a lens in which the water film takes 20 seconds or more to break from the lens surface. Wettability can also be determined by measuring a contact angle on one or both lens surfaces. The contact angle can be a dynamic or static contact angle. Lower contact angles generally refer to increased wettability. For example, a wettable surface of a silicone hydrogel contact lens can have a contact angle less than about 80 degrees.

A "silicone-containing component" is a component that contains at least one [—Si—O—Si] linkage, in a monomer, macromer or prepolymer, wherein each silicon atom may optionally possess one or more organic radical substituents ($R_1$, $R_2$) or substituted organic radical substituents that may be the same as different, e.g., —$SiR_1R_2O$—.

An 'oligomer' is a molecule consisting of a finite number of monomer subunits, and typically contains from about 2 to about 8 monomer subunits.

'Substantially' or 'essentially' or 'about' means nearly totally or completely, for instance, 95% or greater of some given quantity.

'Alkyl' refers to a hydrocarbon chain, typically ranging from about 1 to 20 atoms in length. Such hydrocarbon chains are preferably but not necessarily saturated and may be branched or straight chain, although typically straight chain is preferred. Exemplary alkyl groups include methyl, ethyl, propyl, butyl, pentyl, 1-methylbutyl, 1-ethylpropyl, 3-methylpentyl, and the like. As used herein, "alkyl" includes cycloalkyl when three or more carbon atoms are referenced.

'Lower alkyl' refers to an alkyl group containing from 1 to 6 carbon atoms, and may be straight chain or branched, as exemplified by methyl, ethyl, n-butyl, i-butyl, t-butyl.

The term 'substituted' as in, for example, "substituted alkyl," refers to a moiety (e.g., an alkyl group) substituted with one or more substituents, such as, but not limited to: $C_3$-$C_8$ cycloalkyl, e.g., cyclopropyl, cyclobutyl, and the like; halo, e.g., fluoro, chloro, bromo, and iodo; cyano; alkoxy, phenyl; substituted phenyl; hydroxyl, and the like. For substitutions on a phenyl ring, the substituents may be in any orientation (i.e., ortho, meta, or para).

"Ophthalmic device" as used herein refers to a medical device which is suitable for use on or in an eye of a person. An ophthalmic device can be a contact lens for placement on the corneal epithelium of an eye. Or, an ophthalmic device can be other types of lenses, such as corneal onlays, corneal inlays, or intraocular lenses, as understood by persons of ordinary skill in the art. Examples of ophthalmic devices include both vision correcting contact lenses and non-vision correcting contact lenses, such as cosmetic contact lenses and the like.

The following well-known chemicals are referred to in the specification and the claims. Other abbreviations used and names are provided.

HEMA: 2-hydroxyethyl methacrylate
IBM: isobornyl methacrylate
NVP: 1-vinyl-2-pyrrolidone
VMA: N-vinyl-N-methylacetamide
HOB: 2-hydroxylbutyl methacrylate
"M3-U" or "M3U" refers to αω-Bis(methacryloyloxyethyl iminocarboxy ethyloxypropyl)-poly(dimethylsiloxane)-poly (trifluoropropylmethylsiloxane)-poly (ω-methoxy-poly(ethyleneglycol)propylmethylsiloxane)
FMO411M: FM-0411M; a-Methacryloyloxyethyl iminocarboxyethyloxypropyl-poly(dimethylsiloxy)-butyldimethylsilane
TAIC: 1,3,5-Triallyl-1,3,5-triazine-2,4,6(1H,3H,5H)-trione
AOT: Aerosol OT; bis(2-ethylhexyl) sulfosuccinate sodium salt
TPO: Biphenyl (2,4,6-trimethylbenzoyl) phosphine oxide

DETAILED DESCRIPTION

Overview

The present invention is based on the identification and use of demolding aids in the production of silicone hydrogel products or devices. For example, demolding aids can be used to assist in demolding of polar resin mold members and/or deblocking of silicone hydrogel products from separated polar resin mold members. The demolding aids include chemically reactive agents that are effective, when present in a polymerization mixture, such as a lens precursor composition, and/or a polymerized mixture, such as a polymerized lens product produced in a lens mold, in facilitating or easing the demolding of the mold members of the lens mold. Demolding aids disclosed herein may also improve or facilitate delensing of a polymerized lens product from a lens mold member. The improvements in demolding and delensing are especially apparent when compared to demolding and delensing of substantially identical mold members and lenses that do not include a demolding aid.

The demolding aids described herein can be understood to be optional ingredients included in a polymerization composition used to form an ophthalmic device, without substantially negatively affecting the properties of the ophthalmic device. They are optional because an ophthalmic device can be made without the demolding aids, but the processing can be improved by including a demolding aid in the polymerization composition, as described herein. For example, it can be understood that a control polymerization composition will have certain amounts of certain ingredients that are polymerized to produce an ophthalmic device with desirable properties, such as wettability, oxygen permeability, modulus, ionoflux, elongation, and the like. Changing the amounts, such as the relative amounts, of one or more of these ingredients may negatively affect the properties of the resulting ophthalmic device. The present demolding aids, even if they are in the same chemical class as other ophthalmic device ingredients, can be included in an ophthalmic device polymerization composition to produce an ophthalmic device with desirable properties, such as ophthalmically acceptable properties or clinically acceptable properties, and improve the demolding of the ophthalmic device molds.

New compositions, such as silicone hydrogel lens precursor compositions, polymerized lens products, such as polymerized silicone hydrogel contact lens products present in a contact lens mold member, hydrated hydrogel contact lenses, such as hydrated silicone hydrogel contact lenses, and methods of making contact lenses, such as silicone hydrogel contact lenses, include one or more demolding aids or demolding aid reaction products, as discussed herein. The demolding aids are chemically reactive agents that can be included in a lens precursor composition before the composition is fully polymerized to form a lens in a contact lens mold to facilitate separation of the mold members from each other and/or to facilitate removal of the lens so formed from a mold member.

With the present demolding aids, silicone hydrogel contact lenses having ophthalmically desirable properties or features, such as surface wettabilities, moduli, oxygen permeabilities, and the like, can be rapidly produced in large numbers without requiring surface modifications or surface treatments. The present lenses can be obtained from polar resin molds without requiring the use of ultrasonic energy, temperature differentials, heated liquid soaks, and the like during the demolding process. As described herein, such features are required for demolding polar resin molds that include a substantially identical polymerized mixture without the present demolding aids.

Demolding Aids

It has been found that by including a reactive demolding aid or reactive demolding composition comprising a reactive agent, such as a reactive monomer/polymer reagent, in a polymerization mixture, followed by reacting the polymerization mixture containing the demolding aid in a polar resin mold, the mold halves can be separated with reduced effort, and produce a large percentage of intact lenses following a delensing process. Unexpectedly, hydrophilic reactive agents provided desirable demoldability and delensability of silicone hydrogels polymerized in polar resin molds.

Acrylates

In certain embodiments, the reactive demolding composition described herein comprises a reactive agent selected from the group consisting of acrylates such as alkyl acrylates, preferably lower alkyl acrylates, and alkyl methacrylates, preferably lower alkyl methacrylates, including substituted versions thereof. Exemplary substituted alkyl acrylates or substituted alkyl methacrylates include those possessing one or more hydroxyls substituted on the alkyl group, such as monohydroxyacrylates, dihydroxyacrylates, hydroxy and dihydroxymethacrylates, and other hydroxyalkylacrylates, among others. Additional reactive monomer agents include acrylamides such as methacrylamide and acrylic acids such as methacrylic acid and acrylic acid per se, as well as derivatives and mixtures of any of the foregoing. Particularly preferred reactive demolding agents falling within this classification include 2-hydroxyethyl methacrylate (HEMA); 2-hydroxypropyl methacrylate; 2-hydroxybutylmethacrylate, isobornyl methacrylate, methacrylic acid, acrylamide, methacrylamide, 2-hydroxyethyl acrylate, and methylmethacrylate. The demolding composition in certain embodiments is a surfactant free composition. The demolding composition can comprise, consist essentially of, or consist entirely of a single reactive demolding agent, such as HEMA, or it may comprise, consist essentially of, or consist entirely of, two or more reactive demolding agents. The present reactive demolding agents react with the other components of the polymerization mixture during a polymerizing or curing procedure. The reactive demolding agents useful in the present compositions and methods include reactive agents such as those described above having one or more hydroxy groups, as well as those having no hydroxyl groups, such as methylmethacrylate. One example of the present reactive demolding agents includes acrylate-based materials having one or more hydroxy groups, such as one or two hydroxyl groups. Specific embodiments are described above.

Thus, one embodiment of the invention includes a wettable hydrogel ophthalmic device comprising the reaction product of a silicone monomer mixture or a silicon-containing monomer mixture, a reactive demolding composition and an optional extractable diluent composition. For example, a hydrogel ophthalmic device may comprise a reaction product of reactants comprising at least one silicon-containing monomer or macromer, and a reactive demolding component. In certain embodiments, the foregoing ophthalmic device is a molded contact lens produced using a polar resin mold. The reactive demolding composition of the polar resin-molded silicone hydrogel device may comprise a hydrophilic reactive demolding aid, and therefore, the device can comprise the reaction product of the hydrophilic reactive demolding aid and the other components of the silicone monomer mixture.

The reactive demolding composition may be provided in an amount between about 5% to about 50% (w/w) of the polymerization mixture used to produce the ophthalmic device. In certain embodiments, the polymerization mixture contains from about 20% to about 35% by weight of the reactive demolding composition. For example, the reactive demolding composition may be provided in an amount from about 20% to about 30% by weight of the polymerization mixture. Embodiments of the device may comprise the reaction product of a polymerization mixture comprising a reactive demolding composition that is about 20% or about 25% or about 28% or about 30% of the polymerization mixture.

Liquid Diluents

It has also been found that inclusion of a non-reactive hydroxyl, ether, ketone, amide or $C_1$-$C_{20}$ alcohol-containing liquid diluent in a polymerization mixture can reduce the effort required to demold polar resin molds and yield a high percentage of intact molded products after deblocking. The diluent is capable of subsequent substantial extraction from the polymerized product.

As understood from the disclosure herein, a diluent composition can comprise one or more diluents. For example, a diluent composition may comprise only one diluent, or it may comprise only two diluents, or it may comprise more than two diluents, e.g., a combination of 3, 4, 5, 6, or more different diluents. Thus, certain embodiments of the present devices, such as pre-extracted devices, may comprise a diluent composition. In at least one embodiment, the diluent composition comprises a solvent selected from the group consisting of ether-alcohols, ethers, keto-alcohols, esters, ketones, amides, nitriles, and $C_1$-$C_{20}$ alcohols (e.g., alcohols containing 1, 2, 3, 4, 5, 6, 7, 8, 9, 10, 11, 12, 13, 14, 15, 16, 17, 18, 19, or 20 carbons). In one or more embodiments, the diluent composition comprises a $C_1$-$C_{10}$ alcohol. For example, the diluent may be selected from the group consisting of hydroxymethyl pentanone (HMP), 1,4-dioxane, acetonitrile, acetyl acetone, tetrahydrofuran (THF), ethyl acetate, 2-ethoxyethanol, N,N-dimethylformamide (DMF), isopropanol (IPA), and decyl alcohol, including combinations of any of the foregoing. In another example, the diluent is selected from the group consisting of hydroxymethyl pentanone, N,N,-dimethylformamide, and acetyl acetone, including combinations of the foregoing.

The diluent composition may be provided in an amount from about 5% to about 50% (w/w) of the polymerization mixture. In certain embodiments, the polymerization mixture contains from about 7% to about 45% (w/w) of the extractable non-reactive demolding diluent. For example, the polymerization mixture may contain from about 10% to about 40% (w/w) of the extractable non-reactive demolding diluent. Embodiments of the present devices may be produced from a polymerization mixture containing about 20% or about 25% or about 30% or about 35% (w/w) of an extractable non-reactive demolding diluent.

Tinting Agent

The present ophthalmic devices, such as silicone hydrogel contact lenses, may also comprise a color component. For example, a silicone hydrogel contact lens may comprise a tinting agent to facilitate viewing of the lens during the manufacture or use thereof. The tinting agent may be particularly helpful in visualization of the contact lens in an aqueous liquid, such as a packaging solution or the like. The present ophthalmic devices, including silicone hydrogel contact lenses, may also comprise one or more ultraviolet blocking or filter agents (e.g., a UV blocker) and/or a dye or other pigment useful in forming colored contact lenses that alter the perceived color of a lens wearer's eye.

Polymerization Composition

As discussed herein, the present invention also encompasses a polymerization composition, such as a pre-polymerized silicone hydrogel composition. As understood by the present description, such a polymerization composition refers to a composition that has not undergone a complete polymerization process to form a polymerized product. Thus, the polymerization composition may be free of any polymers formed from polymerization of one or more monomers or other components of the composition, or it may include a minor portion of polymerized products that may have formed prior to exposure to a polymerization source. When the composition is used in the manufacture of ophthalmic devices, such as silicone hydrogel contact lenses, the composition may be understood to be a lens precursor composition.

Silicon-Containing Macromer/Monomer

Certain embodiments of the present polymerization composition comprise a silicon-containing monomer or macromer, and a reactive demolding composition or demolding aid, as disclosed herein. Exemplary silicone macromers are described in U.S. Pat. No. 6,867,245 and in International Patent Publication No. WO 2006/026474, the contents both of which are incorporated herein by reference. Any one or more of the silicon macromers described therein are suitable for use in the compositions and devices of the present invention. One exemplary such macromer is referred to as α-ω-bis(methacryloyloxyethyl iminocarboxyethyloxypropyl)-poly(dimethylsiloxane)-poly (trifluoropropylmethylsiloxane)-poly (ω-methoxy-poly(ethyleneglycol) propylmethylsiloxane) or M3U. One illustrative class of silicone-containing components is a poly(organosiloxane) prepolymer such as fluoro-substituted α, ω-bismethacryloxypropyl polydimethylsiloxane. Another example is fluoro-substituted mPDMS (monomethacryloxypropyl-terminated mono-n-butyl terminated polydimethylsiloxane). Further examples of silicone-containing monomers are polysiloxanylalkyl(meth)acrylic monomers including, without limitation, fluoro-substituted methacryloxypropyl tris(trimethylsiloxy) silane, pentamethyldisiloxanyl methylmethacrylate, and methyldi(trimethylsiloxy)methacryloxymethyl silane, among others. The composition may also contain other monomers, macromers, and the like, that may be useful in the production of silicone hydrogel contact lenses absent the reactive demolding composition. The reactive demolding composition or demolding aid may include any one or more of the reactive demolding agents described herein. In addition, embodiments of the polymerization composition may include one or more diluents, colorants, and the like, as desired.

Lens Mold

The present compositions may be provided in a polar resin mold, such as a polar resin contact lens mold. Or, stated differently, the present invention encompasses polar resin molds that include the present polymerization compositions. In at least one embodiment, the mold comprises, or consists essentially of an ethylene-vinyl alcohol copolymer, such as Soarlite™.

It may be understood that the present invention also encompasses a contact lens mold comprising a first mold member and a second mold member in contact with the first mold member to define a lens-shaped cavity, and a polymerization mixture located in the lens shaped cavity. The polymerization mixture includes a reactive demolding composition or reactive demolding aid which facilitates separation of the first mold member and the second mold member after curing the polymerization mixture to form a polymerized product. In certain embodiments, the polymerization mixture in the lens shaped cavity includes a diluent composition.

The present contact lens molds may also be understood to comprise a first mold member, a second mold member in contact with the first mold member to form a lens shaped cavity, and a polymerized contact lens product which includes the reaction product of a reactive demolding component or agent and lens forming materials.

Method of Producing a Silicone Hydrogel Product

A method of producing a polymerized silicone hydrogel product comprises providing at least one of the present polymerization mixtures in a polar resin mold comprising a first mold member and a second mold member in contact with the first mold member to facilitate separation of the first mold member and second mold member after polymerizing the polymerization mixture. It may be also understood that the present invention encompasses methods of improving the separability of a first polar resin mold member from a second polar resin mold member after polymerizing a polymerization mixture located in a cavity defined by the first polar resin mold member and the second polar resin mold member.

Certain embodiments of the present methods may be directed to production or manufacture of silicone hydrogel contact lenses. In such embodiments, a method can comprise providing a polymerization mixture or polymerization composition which comprises a silicon-containing polymerizable material, and a reactive demolding component. The method comprises placing the polymerization mixture in a first mold member comprising a cavity having a first lens defining surface. The method also comprises placing a second mold member having a second lens defining surface in contact with the first mold member to form a contact lens mold comprising a lens shaped cavity containing the polymerization mixture. The contact lens mold is treated to polymerize the polymerization mixture to form a polymerized lens comprising a reaction product of the demolding component and the other components of the mixture. The method comprises separating the first mold member and the second mold member with reduced effort relative to a substantially identical contact lens mold comprising the same mold-forming material and a polymerization mixture free of the reactive demolding component. The mold members of the present methods comprise a polar resin, and in certain embodiments, comprise a polar resin of ethylene-vinyl alcohol copolymer, such as Soarlite™.

The effort required to separate the first and second mold members can be determined or quantified using a variety of techniques. For example, the demolding effort can be determined by measuring how far a contact lens mold is moved along a separator or splitter device when the first and second mold members separate. As another example, the force required to separate the first and second mold members can be measured. As another example, the time required to separate the first and second mold members can be measured.

Polar resin molds which comprise a polymerizable composition or a polymerized composition, as described herein, can be compared to control polar resin molds that include a polymerizable composition or polymerized composition without a demolding aid.

In certain embodiments, including embodiments encompassed by the examples herein, if a control polar resin mold travels the entire length or distance of a linear splitting device without separating the first and second mold members, a polar resin mold containing the present polymerization or polymerized compositions will be separated with reduced effort if the first mold member and second mold member separate at a length or distance shorter than the control polar resin mold. A linear splitting device may be understood to be a device that includes an edge surface that acts as a wedge between the first and second mold members to cause the mold members to separate as the mold members move along the length of the device. For example, a polar resin mold comprising the present polymerization or polymerized compositions that separates at a distance that is 25% of the length of a splitting device can be understood to be 75% better than control. Similarly, a polar resin mold comprising the present polymerization or polymerized compositions that separates at a distance that is 50% of the length of the splitting device can be understood to be 50% better than control. Similarly, a polar resin mold comprising the present polymerization or polymerized compositions that separates at a distance that is 75% of the length of the splitting device can be understood to be 25% better than control.

With the present compositions, the first mold member and the second mold member can be separated with an effort that is at least 20% less than the effort required to separate the first and second mold members of a control mold. For example, the effort may be about 25%, about 30%, about 50%, about 60%, about 80%, or about 90% less than the effort required to separate first and second mold members of a control mode.

The separation effort can be related to the type of demolding aid or aids provided in the present compositions. For example, inclusion of acrylamide or methacrylamide in the present compositions can reduce the mold separation effort by about 25% compared to a control mold. Inclusion of methacrylic acid in the present compositions can reduce the mold separation effort by about 33% compared to a control mold. Inclusion of hydroxyethyl acrylate or methylmethacrylate can reduce the mold separation effort by about 63% compared to a control mold. Inclusion of HEMA in the present compositions can reduce the mold separation effort by at least about 75% compared to a control mold. Inclusion of hydroxypropyl methacrylate (HPMA) in the present compositions can reduce the mold separation effort by at least about 88% compared to a control mold. In comparison, in certain compositions, inclusion of dimethyl acrylamide appeared to not reduce the mold separation effort.

The embodiments and examples discussed and disclosed in the present application are illustrative only and do not exclude the use of other materials and/or other components, such as optional color components. For example, addition of 0.1 parts of a tinting agent, such as copper phthalocyanine blue, to the mixture results in a formulation in which the characteristics of the finished ophthalmic device have not changed.

In the following examples, the polymerization mixtures were cured in contact lens molds made of Soarlite™ resin. The molds containing the polymerization mixture were UV cured for about 1 hour, followed by thermal treatment at 80° C. for about 15 minutes.

EXAMPLES

The following examples illustrate certain aspects and advantages of the present invention, which should not be understood to be limited thereby.

Example 1

Preparation of a Monomer Premix Composition

The following components (in Table 1) were added together to form a monomer premix composition.

TABLE 1

| Components | Parts by Weight | Weight for batch (g) |
|---|---|---|
| AOT | 0.8819 | 0.2205 |
| TAIC | 0.1763 | 0.0441 |
| NVP | 52.9100 | 13.2275 |
| IBM | 10.5820 | 2.6455 |
| HOB | 17.6367 | 4.4092 |
| VMA | 17.6367 | 4.4092 |
| Total Weight | | 24.9559 |

Example 2

Preparation of a Macromer Premix Composition

The following components (in Table 2) were added together to form a macromer premix composition

TABLE 2

| Components | Parts by Weight | Weight for batch (g) |
|---|---|---|
| FM-0411M | 9.0334 | 3.2159 |
| M3-U | 39.7471 | 14.1500 |
| Total Weight | | 17.3659 |

Example 3

Preparation of a Polymerization Composition without a Reactive Demolding Agent The following components (in Table 3) were added together to form a polymerization composition without a reactive demolding agent. The premix refers to the composition of Example 1, and the macromer mix refers to the composition of Example 2

TABLE 3

| Components | Parts by Weight | Weight for batch (g) |
|---|---|---|
| Premix | 51.1292 | 17.1794 |
| TPO | 0.0903 | 0.0303 |
| Macromer mix | 48.7805 | 16.3902 |
| Total Weight | | 35.5999 |

Example 4

Preparation of a Polymerization Composition with a Reactive Demolding Agent

The following components (in Table 4) were added together to form a polymerization composition comprising a reactive demolding agent. The monomer mix refers to the composition of Example 3. The composition of Example 4 is a lens precursor composition.

TABLE 4

| Components | Parts by Weight | Weight for batch (g) |
|---|---|---|
| Monomer mix | 100.0000 | 1.00 |
| HEMA | 20.0000 | 0.200 |
| Total Weight | | 1.200 |

The use of HEMA as a reactive demolding agent in Table 4 is not intended to be limiting but only representative of the type of demolding agent that is used.

A control ophthalmic device was fabricated using the Monomer mix composition presented in Example 3 in an ethylene-vinyl alcohol copolymer (Soarlite™) mold set. In the control mold there was considerable difficulty in separating the molds at ambient conditions post-cure. For example, first and second mold members (e.g., male and female mold members) must be separated using ultrasonic energy, warm water soaking, and wedging devices.

By contrast an ophthalmic device formulated in a Soarlite™ mold, but where HEMA was added as shown in Table 4 above, the mold halves were separated without much difficulty. For example, ultrasonic energy and warm water soaking were not required.

In addition, delensing of the polymerized lens product from the female mold was easier compared to the control ophthalmic device. For example, the lens could be separated from the mold by soaking in water at room temperature and floated off of the mold cavity surface.

Example 5

Preparation of a Polymerization Composition Comprising a Reactive Demolding Agent and a Diluent The monomer and macromer components are prepared as disclosed in Examples 1-3. However, the polymerization mixture was prepared by adding HEMA and a diluent, hydroxymethyl pentanone (HMP), to the polymerization mixture, as shown in Table 5.

TABLE 5

| Components | Parts by Weight | Weight for batch |
|---|---|---|
| Monomer mix | 100.0000 | 1.0000 |
| HEMA | 20.0000 | 0.2000 |
| Diluent-HMP | 7.5000 | 0.0750 |
| Total Weight | | 1.2750 |

As in the previous example, the polymerization mixture was formulated in an identical manner as the control polymerization mixture, but where HEMA and the diluent were present in the amounts, as shown above, the mold halves were separated without significant trouble, (i.e. the mold separation effort was reduced by 75% based on the linear splitting device method described above). Moreover, the delensing process was made much easier as well. The mold half containing the contact lens was soaked in water at room temperature, and the lens floated from the mold surface. Any remaining diluent was subsequently extracted with alcohol and/or water.

Example 6

Preparation of a Polymerization Composition Comprising a Reactive Demolding Agent This experiment was conducted under the same conditions as Example 1, however, Step 4 of the formulation (the final polymerization mix) was as follows. Step 4: Preparation of Final mix

TABLE 6

| Components | Parts by Weight | Weight for Batch |
|---|---|---|
| Monomer mix | 100.0000 | 1.0054 g |
| HPMA | 30.0000 | 0.1534 g |
| Total Weight | | 1.1588 g |

Hydroxypropyl methacrylate (HPMA) is a reactive demolding monomer. This ingredient was added to the final polymerization mix at a level of 15 parts by weight, and the mixture was permitted to polymerize under UV light for one hour. The mold sets were then placed at 80° C. prior to demolding. No extractable diluent was added to the final mix before polymerization in this experiment.

The Soarlite™ mold halves were relatively easily separated, that is, the mold separation effort was reduced by 88% using the linear mold splitting method described hereinabove, and the lenses floated off the mold when placed in water. The resulting lenses possessed a wettability score of 5 or greater using the wettability assay described above.

Example 7

Preparation of a Polymerization Composition Comprising a Reactive Demolding Agent This experiment was conducted under the same conditions as Example 1, however Step 4 of the formulation (the final polymerization mix) was as follows. Step 4: Preparation of Final mix

| | |
|---|---|
| Monomer mix | 100.0000 |
| MMA | 20.0000 |
| Total Weight | |

Methylmethacrylate (MMA) is a reactive demolding monomer. This monomer was added to the final polymerization mix at a level of 30 parts by weight, and the mixture was permitted to polymerize under UV light for one hour. The mold sets were then placed at 80° C. prior to demolding. No extractable diluent was added to the final mix before polymerization in this experiment.

The Soarlite™ mold halves were relatively easily separated, and the lenses floated off the mold when placed in water. The resulting lenses had a wettability score of 5 or greater using the wettability assay described above.

While this invention has been described with respect to various specific examples and embodiments, it is to be understood that the invention is not limited thereto and that it can be variously practiced with the scope of the following claims.

A number of publications and patents have been cited hereinabove. Each of the cited publications and patents are hereby incorporated by reference in their entireties.

What is claimed is:

1. A method of producing a silicone hydrogel device comprising the steps of:
   providing a polymerization composition comprising a silicon-containing monomer or macromer, a keto-alcohol diluent component, and a reactive demolding component, in a polar resin mold;
   polymerizing the polymerization composition to form a polymerized silicone hydrogel device; and
   separating the polar resin mold to reveal the polymerized silicone hydrogel device with a reduced effort relative to separating a substantially identical polar resin mold containing a polymerized product of a substantially identical composition without the demolding component, wherein said keto-alcohol diluent component is present in an amount of from about 5% to about 50% (w/w).

2. The method of claim 1, wherein said reactive demolding component comprises an agent selected from the group consisting of acrylic acids, methacrylic acids, derivatives thereof, and mixtures thereof.

3. The method of claim 2, wherein the reactive demolding component comprises an agent selected from the group consisting of monohydroxyacrylates, dihydroxyacrylates, hydroxy methacrylates, hydroxypropylmethacrylates, methacrylates, hydroxyalkylacrylates, acrylamides, methacrylamides, and mixtures thereof.

4. The method of claim 2, wherein said reactive demolding component is selected from the group consisting of 2-hydroxyethyl methacrylate, hydroxypropyl methacrylate, methacrylic acid, acrylamide, methacrylamide, hydroxyethyl acrylate, and methylmethacrylate.

5. The method of claim 4, wherein said reactive demolding component is 2-hydroxyethyl methacrylate.

6. The method of claim 4, wherein said reactive demolding component is 2-hydroxypropyl methacrylate.

7. The method of claim 1, wherein the reactive demolding component is present in an amount from about 20% and about 30% (w/w) of said polymerization composition.

8. The method of claim 7, wherein the reactive demolding component is present in an amount from about 20% and about 35% (w/w) of said polymerization composition.

9. The method of claim 1, wherein the diluent component is present in an amount from about 7% to about 45% (w/w) of the mixture.

10. The method of claim 9, wherein the diluent component is present in an amount from about 10% to about 40% (w/w) of the mixture.

11. The method of claim 1, wherein said polymerization composition further comprising a color component.

12. The method of claim 1, wherein the keto-alcohol diluent component comprises hydroxymethyl pentanone (HMP).

13. The method of claim 1, wherein the reactive demolding compound comprises 2-hydroxybutyl methacrylate.

14. The method of claim 1, wherein the method further comprises the steps of:
   combining the silicon-containing monomer or macromer and the keto-alcohol diluent component to form a premix composition;
   adding the reactive demolding component to the premix composition to form the polymerization composition; and
   placing the polymerization composition in the polar resin mold.

* * * * *